United States Patent [19]

Koehler et al.

[11] 3,710,710

[45] Jan. 16, 1973

[54] METHOD FOR TRANSFERRING COTTON BALES

[75] Inventors: Albert T. Koehler, Monticello; Paul J. Shideler, Logansport, both of Ind.; Linus E. Dohogne, Paragould, Ark.

[73] Assignee: A. J. Gerrard & Company, Des Plaines, Ill.

[22] Filed: Nov. 3, 1971

[21] Appl. No.: 195,524

Related U.S. Application Data

[62] Division of Ser. No. 887,963, Dec. 24, 1969, Pat. No. 3,673,950.

[52] U.S. Cl. ...................................................100/3
[51] Int. Cl. .............................................B65b 13/02
[58] Field of Search......100/3, 7, 100, 137, 215, 218, 100/233, 264, 269 R, 295

[56] References Cited

UNITED STATES PATENTS

| 2,728,287 | 12/1955 | Tillinghast | 100/3 X |
| 2,812,708 | 11/1957 | Tillinghast | 100/3 X |
| 3,541,948 | 11/1970 | Sauer et al. | 100/3 |
| 3,459,119 | 8/1969 | Wiklund | 100/7 |
| 3,590,731 | 7/1971 | Nichols | 100/3 |

Primary Examiner—Billy J. Wilhite
Attorney—Johnson, Dienner, Emrich, Verbeck & Wagner

[57] ABSTRACT

An apparatus for automatically transferring cotton bales from an unbanding station to a press and rebanding station.

2 Claims, 13 Drawing Figures

METHOD FOR TRANSFERRING COTTON BALES

This is a division of application Ser. No. 887,963, filed Dec. 24, 1969 now U.S. Pat. No. 3,673,950.

To prepare cotton bales for shipping, it is a common practice in the cotton industry to rebale the cotton into a smaller dimensioned compressed bale so that more bales can be transported with a given amount of cargo space.

The first step in the rebaling process is to compress the cotton sufficiently to remove the bands around the bales. The unbanded cotton bale is then moved into a large press where it is further compressed to a smaller height dimension and then rebanded.

In the present state of the art, the handling of the cotton bales during the rebaling process is performed manually, requiring a large amount of manpower. Due to the rising cost of labor and the general shortage of manpower in the cotton industry, there is a great need to automate the handling of the cotton during the rebaling process.

In the present state of the art it is necessary to use some sort of temporary fasteners on each bale prior to removing its bands, otherwise the cotton would expand uncontrollably before it could be transferred into the large press at the press and rebanding station. These temporary fasteners are then removed once the cotton bale is placed in the press. The installation and removal of these temporary fastener devices require employment of several workers.

Accordingly, an object of this invention is to provide a method for automatically transferring a cotton bale from the unbanding station to the press and rebanding station.

A further object of this invention is to provide a method for transferring a cotton bale from the unbanding station to the press and rebanding station in a shorter time period than heretofore has been possible.

Another object of the present invention is to provide a method for transferring a cotton bale from the unbanding station to the press and rebanding station, which apparatus holds the bale in compression throughout the transferring process so as to prevent any loss of cotton from the bale.

Further objects and advantages of the present invention will become apparent as the following specification proceeds and the features of novelty which characterize the invention will be pointed out with particularity in the claims annexed to and forming a part of the specification.

For a better understanding of the present invention, reference may be had to the accompanying drawings in which.

Figures 1, 2:
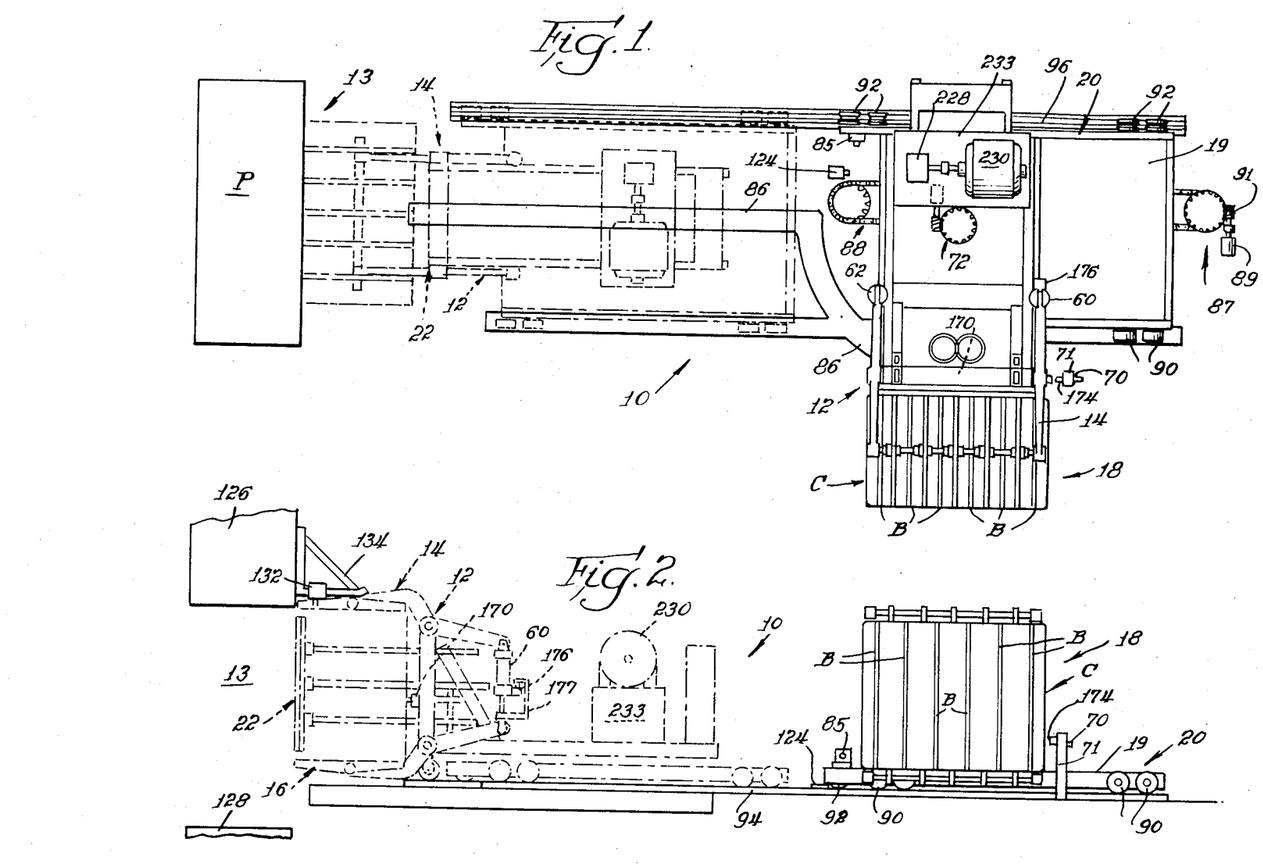
FIG. 1 is a top elevational view of the preferred embodiment of my invention.
FIG. 2 is a front elevational view of the embodiment shown in FIG. 1.

There is shown in FIG. 1, an automatic cotton bale transfer apparatus embodying the principles of this invention and generally designated by the reference numeral 10. In the cotton bale transfer apparatus 10, a small press unit 12 operates to compress a bale of cotton disposed between its upper and lower fork members 14 and 16 at a loading station 18 to permit the removal of its bands B. After the bands B are removed, the operator, as will be explained in full detail hereinafter, presses a start button which initiates the automatic transfer of the cotton bale C to a press and rebanding station 13 at the left end of the FIG. 1.

Briefly, the sequence of operations of cotton bale transfer apparatus 10 is as follows: The press unit 12 is rotated 90° clockwise with respect to carrier frame 19 of the carriage assembly 20. The carriage assembly 20 is then driven to the left as viewed in FIG. 1 until press unit 12 reaches the press and rebanding station 13 (dotted position of FIG. 2). The extractor assembly 22, which is carried by the press unit 12, is then energized simultaneously with the opening of fork members 14, 16 to push the cotton bale C into the center of the press P. Upon completion of this operation, the carriage assembly 20 automatically returns to its original starting position and the press unit 12 is rotated 90° counterclockwise on carrier frame 19 where another cotton bale C is waiting. The cycle is completed when the upper and lower forks 14 and 16 are driven into compressing engagement with the second cotton bale C.

After the operator has removed the bands B from the second cotton bale C, he presses the start button and the cotton bale transfer apparatus 10 automatically repeats the operations described above.

Figure 3:
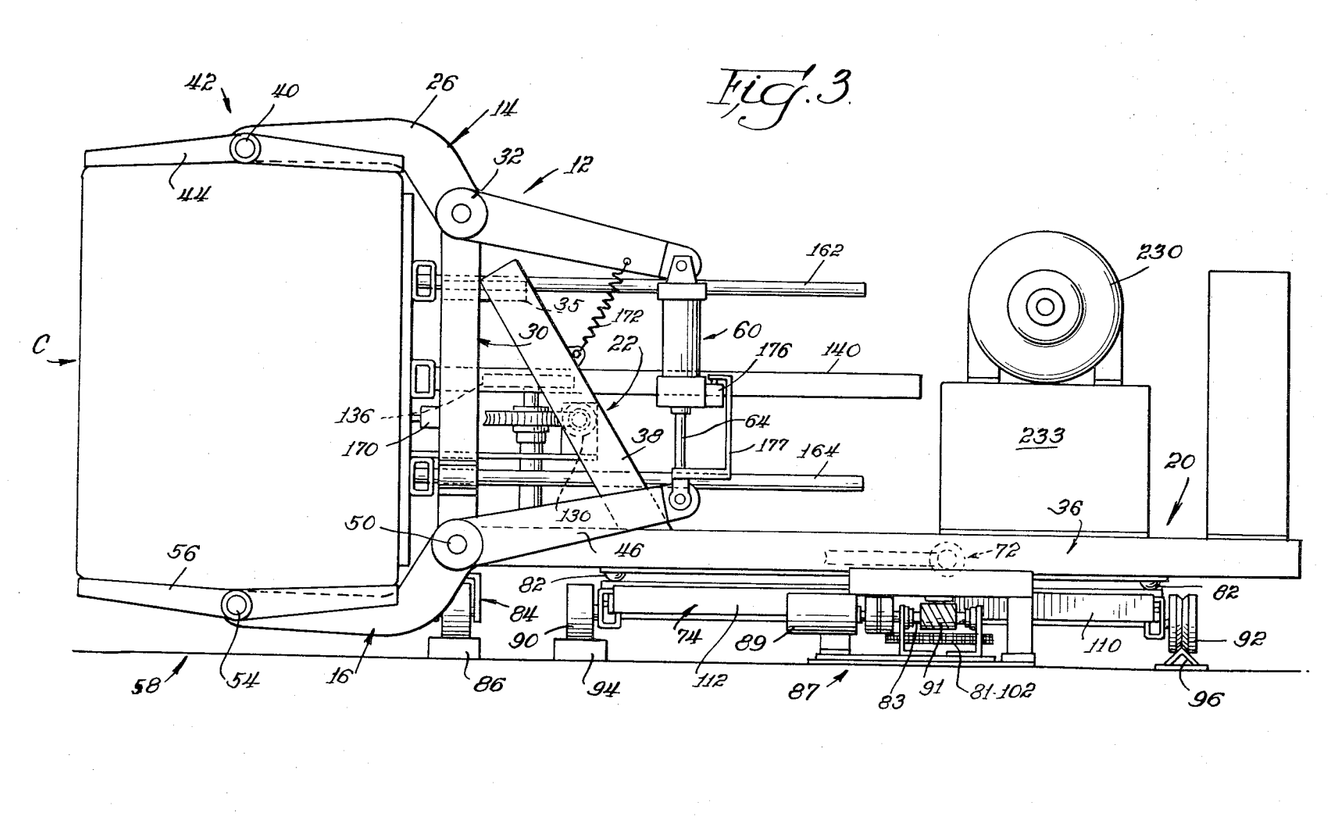
FIG. 3 is a side elevational view of the cotton bale carriage assembly depicted in FIG. 2 as shown in the loaded position at the unbanding station.

Referring to FIG. 3, the upper and lower fork member 14, 16 are pivotally mounted to a vertical frame member 30, which is rigidly supported on the forward end of a horizontal turntable 36 of carriage assembly 20. The vertical frame member 30 consists of two vertical legs 31 and 33 (FIG. 4) which have their lower ends fastened, as by welding, to two horizontal extensions 15 and 17 (FIG. 4), respectively, that extend beyond the forward end 19 of turntable 36. The legs 31, 33 are held in a parallel, spaced apart relationship by two horizontal cross-bars 21, 23. To rigidly support the frame member 30, two angle braces 38 and 40 are secured, as by welding, between the turntable 36 and two horizontal segments 35 and 37, respectively, which are secured preferably by welding, to vertical legs 31 and 33.

Referring to FIGS. 3, 4, 10 and 11, it can be seen that the upper and lower fork members 14 and 16 have substantially identical constructions. The upper fork 14 has two arm portions 26 and 28 which are pivotally mounted at their mid-section, respectively, to two spacer members 27 and 29 that are fastened by welding to the upper ends of vertical legs 31 and 33 of frame member 30. A cylindrical rod 40 interconnects the forward end of the arm portions 26 and 28. The rod 40 carries an upper cotton bale engaging unit 42 which consists of a plurality of pressure blades 44 which are mounted on rod 40 in an equal space relationship. The pressure blades 44 are capable of limited pivotal motion about rod 40 to permit them to conform to irregular contours of a cotton bale C.

Figure 4:
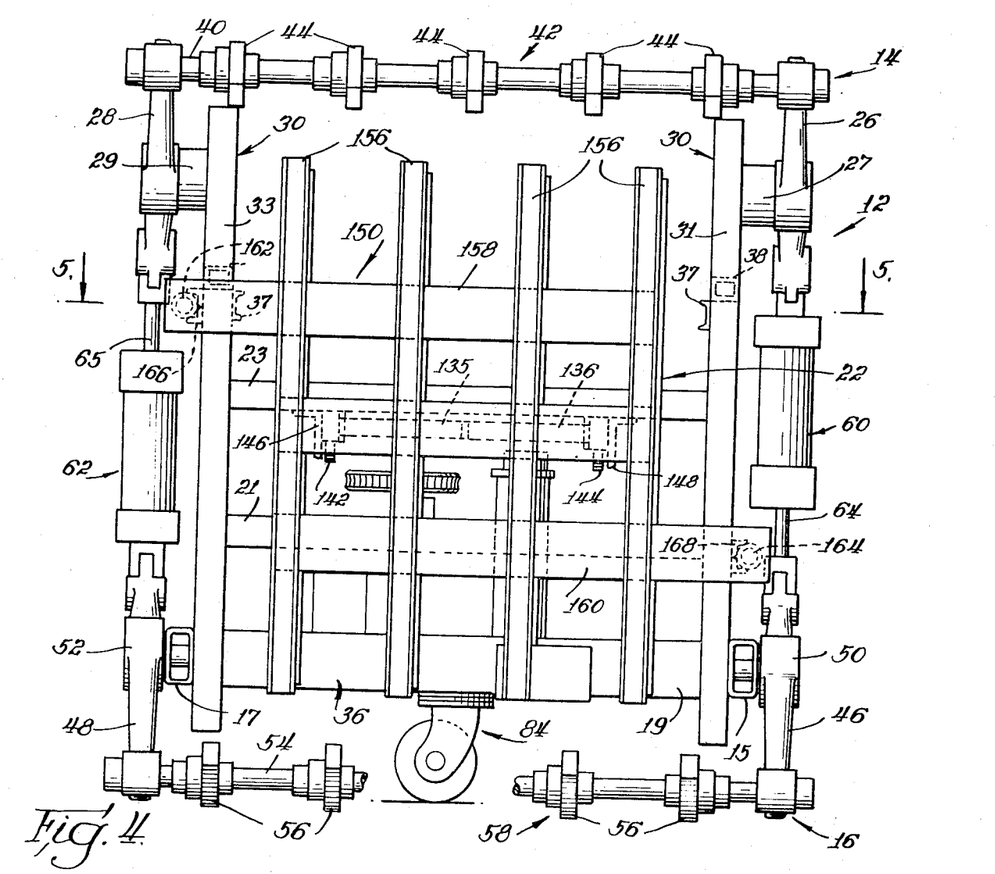
FIG. 4 is a front elevational view of the press unit carried by the carriage assembly of FIG. 3 as shown with the upper and lower fork members in the open position.

The lower fork member 16 similarly has two arm members 46 and 48 which are pivotally mounted at 50 and 52, respectively, at their mid-section on the horizontal extensions 15, 17 of turntable 36. As best seen in FIG. 4, the forward end of the arm members 46 and 48 are interconnected by a rod 54 which carries a plurality of spaced apart pressure blades 56 to provide a lower cotton bale engaging assembly 58. The pressure blades 56 are capable of having a limited pivotal movement to conform to the irregular contour of the cotton bale C.

To open and close the upper and lower fork members 14 and 16 in unison, the rearward end of the pair of arm members 26, 28 are pivotally interconnected, respectively, to the pair of arm members 46, 48 of lower fork member 16 by means of a pair of hydraulic cylinder and piston units 60 and 62, respectively. As can be appreciated by referring to FIG. 3, when the hydraulic cylinder and piston units 60, 62 are simultaneously actuated to expand the respective piston rods 64 and 65 outwardly, the upper and lower cotton bale engaging assemblies 42 and 58 are drawn towards each other to compress the cotton bale C disposed therebetween. As is clear from referring to FIGS. 1 and 2, the pressure blades 44 of the upper fork member 14 and the pressure blades 56 of the lower fork member 16 are spaced apart to engage the upper and lower ends of the cotton bale C in an alternate relationship with the bands B to permit the ready removal of the bands B. Preferably, the upper and lower fork members 14, 16 should compress the cotton bale about 10 inches to enable the bands B to be easily removed.

After the bands B have been completely removed from the cotton bale C, the operator presses the start button 70 located on a floor-mounted vertical post 71 (FIG. 2) at the loading station 18, which immediately energizes the turret assembly 72 to turn the turntable 36 and associated press unit 12 ninety degrees clockwise, as illustrated in FIG. 1. The turret assembly 72 (FIG. 11) uses a worm 76 coupled to the output shaft of a hydraulic motor 78 to drive the turntable 36 about a spur gear 80 which is mounted in a non-rotatable relationship with carrier frame 74. Thus, the hydraulic motor 78 and worm 76 turn about gear 72 to rotate turntable 36.

To support the turntable 36, a plurality of ball transfer elements 82 are mounted in a circular path to the underside of the turntable 36, preferably spaced apart about 15°. Because most of the weight is carried at the front end of the turntable 36, a swivel wheel unit 84 is mounted at the forward end of the turntable 36 approximately at the mid-center across the width of the turntable 36. A narrow track 86 (FIG. 1) is provided to support the swivel wheel unit 84 throughout the travel of the carriage assembly 20.

The carriage assembly 20 is carried by a set of wheels 90, 92. Referring to FIG. 3, the wheels 90 mounted the left side of carrier frame 74 of carriage assembly 20 have a flat peripheral surface which rides along the straight flat surface rail 94. The wheels 92 on the right side of the carrier frame 74 have a V-groove peripheral surface which follows the V-shaped rail 96 to guide the carriage assembly 20 in a straight path. As can be seen in FIG. 1, the preferred embodiment employs a pair of wheels 90, 92 at each corner of the carriage frame 74. It is to be understood that one wheel at each location would serve the same function. To permit the swinging of swivel wheel assembly 84 about the carrier frame 74, the forward pair of wheels 90 is set back somewhat as illustrated in FIG. 1, as compared with the corresponding forward pair of wheels 92.

Figures 6, 7, 8, 9:
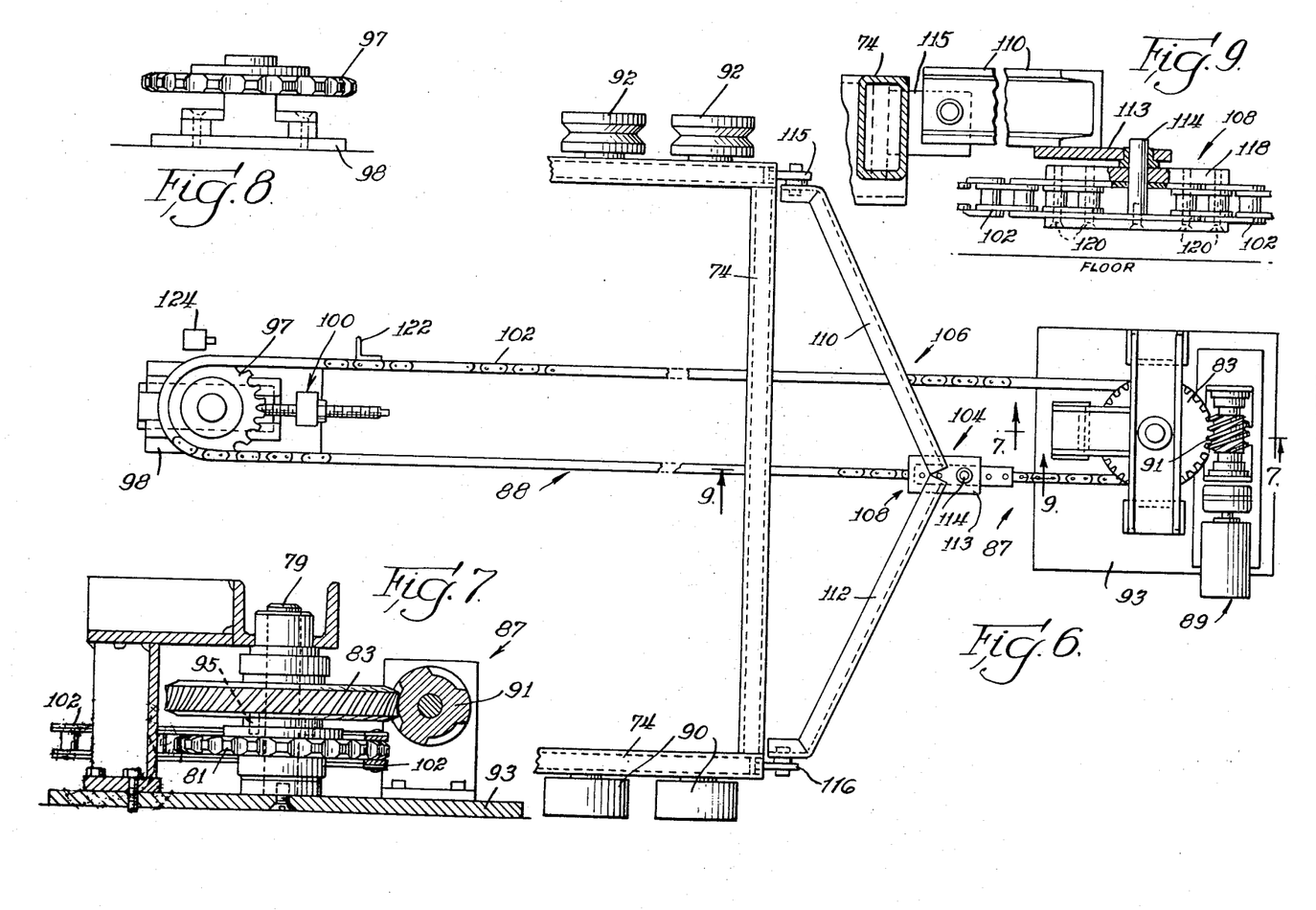
FIG. 6 is a top plan view illustrating the chain drive assembly which transports the cotton bale carriage assembly from the unbanding station to the press and rebanding station.
FIG. 7 is a sectional view taken along the line 7—7 of FIG. 6 and looking in the direction of the arrows.
FIG. 8 is an end view of the left hand of the chain drive assembly shown in FIG. 6.
FIG. 9 is a sectional view taken along the line 9—9 of FIG. 6.

When the turret drive assembly 72 has rotated the press unit 12 through a 90° angle and moved the press unit 12 from the bale loading orientation to the bale unloading orientation, the turntable 36 (FIG. 1) actuates electrical switch 85 to energize the chain drive assembly 97 (FIG. 6) which moves the carriage assembly 20 in the forward direction to the press and rebanding station 13 (represented by the dotted lines in FIGS. 1 and 2). As illustrated in FIGS. 3 and 6, the chain drive assembly 87 consists of a chain drive unit 88 extending between and parallel to the rails 94, 96 and a hydraulic motor 89 which drives the chain drive sprocket 90 by means of the cooperation between a worm 91 mounted on the output shaft of the hydraulic motor 89 and worm gear 92.

Referring to FIG. 7, there is shown the structural relationship between worm 91, worm gear 92 and chain drive sprocket 90, all of which are mounted on a rectangular plate 93. The worm gear 92 and chain drive sprocket 90 are rotatably mounted on shaft 94. A plurality of studs 95 interconnect chain drive sprocket 90 and worm gear 92 so that chain drive sprocket 90 will rotate with worm gear 92 to drive chain 102.

At the left hand end of the chain unit 88 is a idler sprocket 97 which is adjustably mounted on a pedestal 98 (FIG. 8) and may be shifted toward or away from drive sprocket 90 by means of an adjustable screw device 100 to make the chain 102 taut. It is necessary that the chain 102 be made substantially taut since the chain unit 88 is driven in two directions.

The coupling unit 104 for interconnecting the chain drive assembly 87 to the carriage assembly 20 consists of a V-frame 106 and a chain link unit 108. The V-frame 106 has two diverging arm members 110, 112 which are joined together at one end by a rivet secured to rectangular plate 113. The rectangular plate 113 is also secured to pin 114 (FIG. 9) whose lower end is secured to the chain link unit 108. The outer ends of the arms 110, 112 are connected by means of brackets 115, 116, respectively, to the opposite corners of the right hand end of carrier frame 74. The brackets 115, 116 are secured to the frame 74 by welding or some other suitable means and are fastened to the frame arms 110, 112 by means of a nut and bolt arrangement or equivalent type fasteners. The chain coupling unit 108 receives the ends of the chain 102 in a bore formed through the length of block 118 and secures the opposite ends of the chain 102 to the block 118 by means of screws 120.

Referring to FIG. 6, there is shown an actuating member 122 carried by chain 102 which actuates an electrical contact switch 124 when the carrier frame 74 returns from the press and rebanding station 13 and arrives at its starting position (at the right end). The hydraulic and electrical control circuitry for performing this function will be explained hereinafter.

Figure 10:
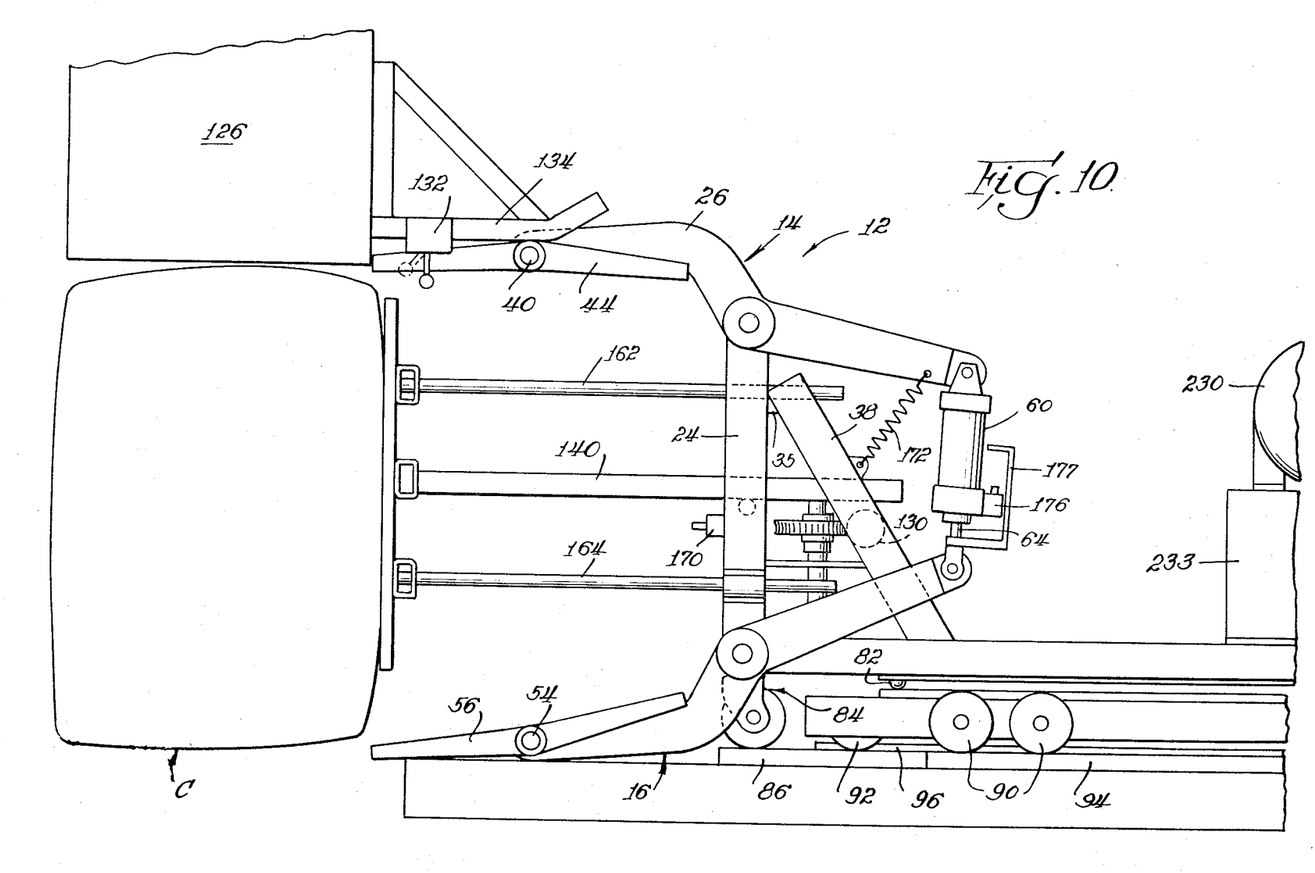
FIG. 10 is an enlarged partial view of the carriage assembly of FIG. 3 showing the cotton bale being ejected from the press unit of FIG. 4.
Figure 11:
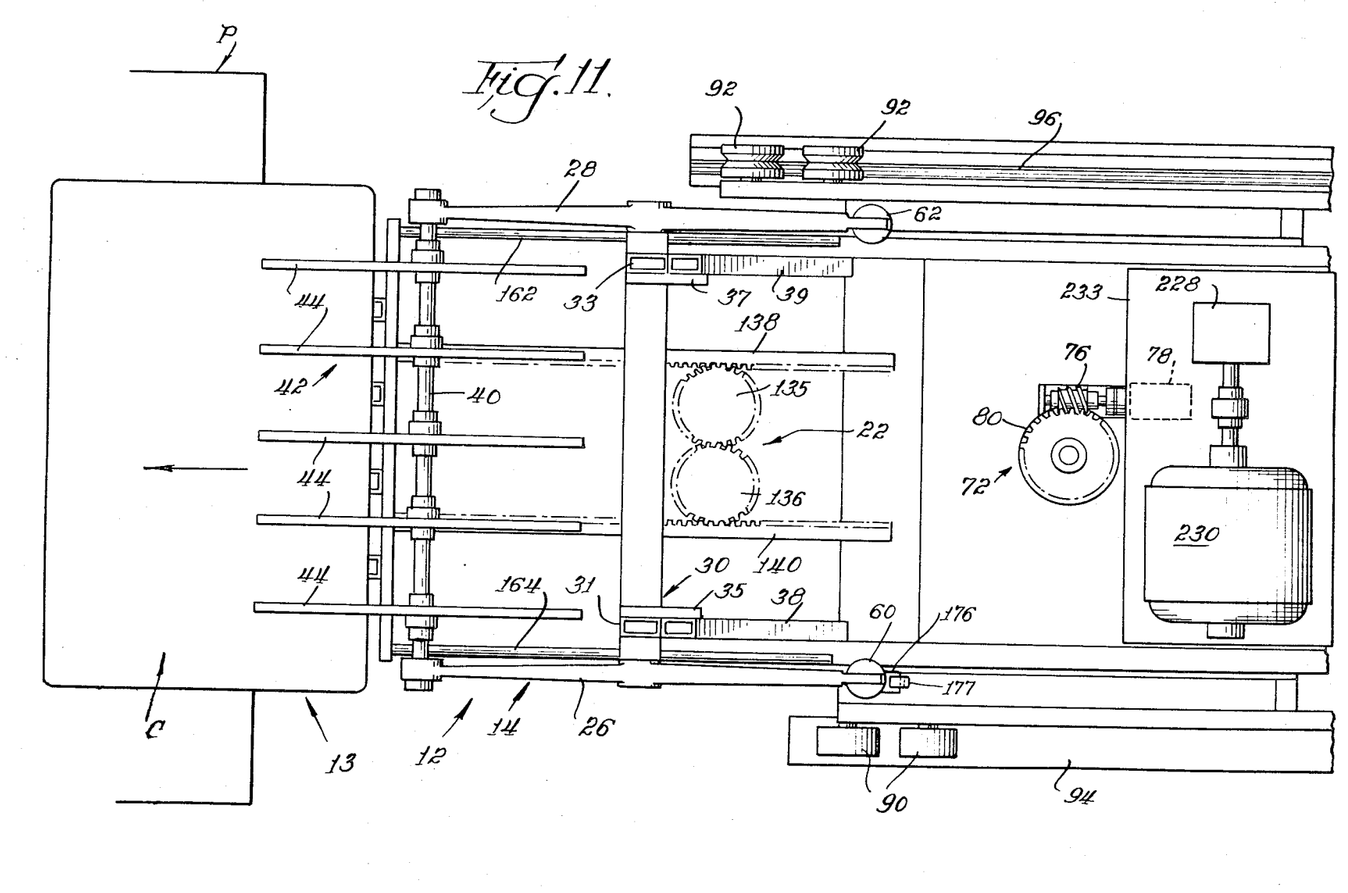
FIG. 11 is a top elevational view of FIG. 10.
Figure 12:
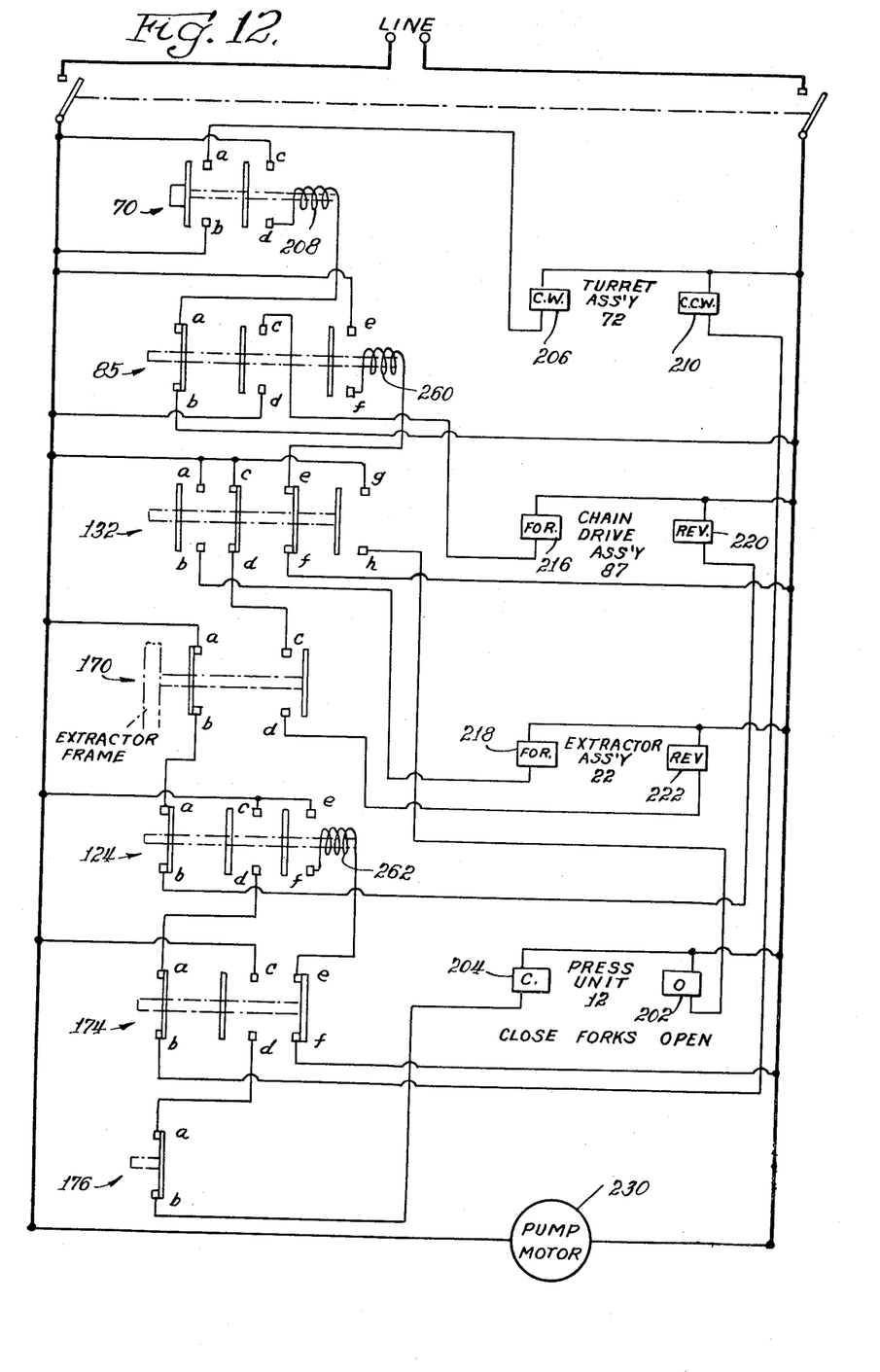
FIG. 12 is a schematic diagram of the electrical control circuits for the preferred embodiment of this invention.

Referring to FIGS. 10 and 11, when the carriage assembly 20 arrives at the press and rebanding station 13, the cotton bale C trips an electrical contact switch 132 extending downwardly from the bracket 134 which simultaneously deenergizes hydraulic motor 89 to stop the forward movement of carriage assembly 20 and energizes the hydraulic and piston units 60, 62 in such a manner that the respective piston rods 64, 65 are withdrawn into the cylinder to urge the fork members 14, 16 to spread apart. The upper fork member 14, however, is restrained from moving upwardly due to the engagement with the bracket 134, for the reason that the upper platen 126 is a stationary member in the press P. Also, simultaneously with the energization of cylinder and piston units 60 and 62, the extractor drive assembly 22 is energized to eject the cotton bale C away from the press unit 12 and into the press P between the upper and lower platen members 126, 128.

Figure 5:
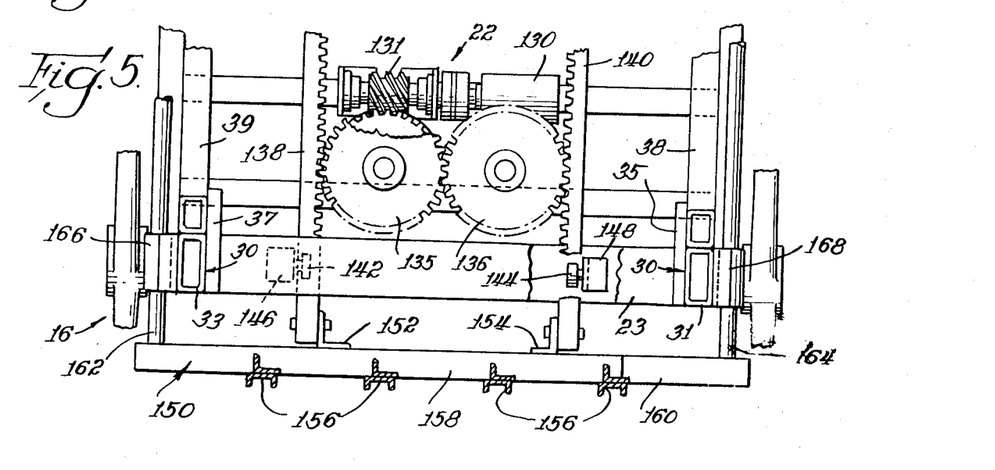
FIG. 5 is a sectional view taken along the line 5—5 of FIG. 4 and looking in the direction of the arrows.

As best illustrated in FIG. 5, power is provided for the extractor assembly 22 by a hydraulic motor 130 which has a worm 131 mounted on its output shaft that drives spur gears 135, 136. The spur gears 135, 136 cooperate, respectively, with tooth rack members 138, 140. The tooth rack members 138 and 140 are slidingly mounted beneath cross bar 23 of vertical frame 30 by means of two linear bearing members 142 and 144 (FIG. 4) which are mounted to the cross bar 23 by means of the respective brackets 146, 148. The outer ends of rack members 138, 140 are secured to vertical extractor frame 150 by means of brackets 152, 154 (FIG. 5).

The vertical extractor frame 150 consists of a plurality of elongated vertical U-shaped bars 156 which are held together in a parallel spaced apart relationship by upper and lower horizontal cross bars 158, 160. As can be seen in FIG. 4, the upper horizontal cross bar 156 extends outside the limits of vertical legs 33 of frame member 30 and has a cylindrical guide rod 162 secured in a perpendicular relationship to its left end. The lower horizontal cross bar 160 similarly extends beyond the other vertical leg 31 of frame member 30 and has a guide rod 164 secured in a perpendicular relationship to right outer end. The U-shaped bars 156 are spaced apart a distance equal to the distance separating the bands B of a cotton bale C and their width is slightly larger than the width of the bands B to permit the ready removal of the bands B after the cotton bale C has been compressed by the upper and lower fork members 14, 16.

Guide rods 162, 164 are slidingly mounted in brackets 166, 168, respectively, which extend outwardly from legs 33 and 31 of vertical frame member 30 and function to prevent the extractor frame 150 from turning or twisting as it is moved forward to eject a cotton bale C. In FIG. 10, there is an illustration of the extractor assembly 22 with the guide rods 162 and 164 in their fully extended positions.

When the extractor assembly 22 has returned to the withdrawn position of FIG. 3, electrical switch 170, which is carried by vertical frame member 24, is depressed to energize the chain drive assembly 84 in the reverse direction and to move the carriage assembly 20 away from the press and rebanding station 13. Referring to FIGS. 10 and 11, as the upper fork member 14 clears the end of bracket 134 two identical spring members 172 (one of which is shown in FIG. 10) connected between the angle braces 38, 40 and the respective rearward ends of arm portions 26 and 28 of upper fork member 14, exert a pull on the upper and the lower fork members 14 and 16 to pivot them in a clockwise direction and cause the respective cotton bale engaging units 42 and 58 to raise. The purpose of using the springs 172 is to insure that the lower fork member 16 will be above the level of the track 84 when the turntable 36 swings counterclockwise across the track 94 to return the press unit 12 to the unbanding station 18.

By having the fork members 14 and 16 return to the unbanding station 18 in the open position, they can swing about a cotton bale C already positioned at unbanding station 18 by a suitable conveyor means such as a fork-lift truck. When the press unit 12 is swung counter-clockwise through a ninety degree angle, electrical switch 174 on post 71 (FIG. 1) is actuated by vertical frame member 30 to simultaneously de-energizes the hydraulic motor 78 of turret assembly 72 and energizes hydraulic cylinder and piston units 60, 62 to cause the upper and lower fork members 14, 16 to close and apply a compression force on the cotton bale C. After the piston rod 66 of hydraulic unit 60 has moved a predetermined distance, electrical switch 174 (FIG. 2) is actuated by actuating lever 177 on hydraulic unit 60 to remove the fluid supplied to the hydraulic unit 60, 62. At this point, the complete automatic cycle of the cotton bale transfer apparatus 10 is completed and the operator removes the bands B from the bale C before depressing the start button 70 to initiate a new cycle.

Figure 13:
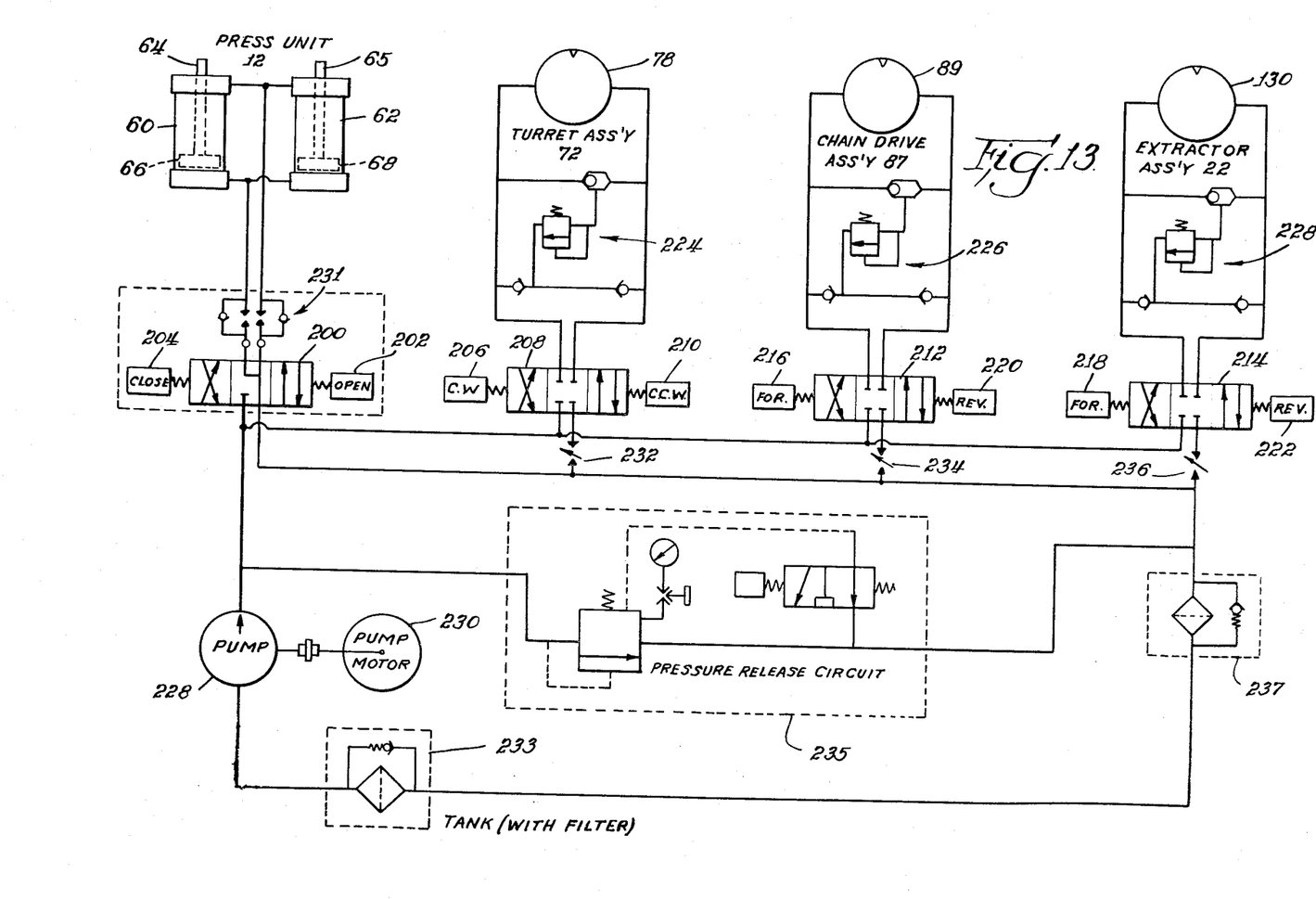
FIG. 13 is a hydraulic schematic diagram of the hydraulic controls of the preferred embodiment of this invention.

There is illustrated in FIG. 13, a schematic diagram of the hydraulic circuit for the cotton bale transfer apparatus 10. All the hydraulic components shown in FIG. 13 are commercially available hydraulic components. A spool valve 200 is used for controlling the opening and closing of the piston and hydraulic unit 60, 62 which cooperates to open and close the fork members 14, 16. When the electrical Open solenoid 202 is energized the spool valve 200 is moved to the right to direct the fluid through the hydraulic piston and control unit 60, 62 in such a manner that their respective pistons 66, 68 are drawn inwardly to open the fork members 14, 16. When the close solenoid 204 is energized, the spool valve 200 is forced to the left which reverses the direction of fluid through the piston and hydraulic units 60, 62 so that their respective pistons 66, 68 are pushed outwardly and close the fork members 14, 16.

The three hydraulic motors 78, 88 and 130 also use spool valves to control the direction of rotation of their output shafts. Each of these spool valves are similarly operated by electrical solenoids to permit the fluid to flow through the hydraulic motors in one of two directions, and thereby control the direction of their output shafts' rotation. When Clockwise solenoid 206 is energized, it moves spool valve 208 to the right to cause the hydraulic motor 78 to rotate the turntable 36 in a clockwise direction. Likewise, when the counterclockwise solenoid 210 is energized, it moves the spool valve 208 in the opposite direction to reverse the direction of fluid through the hydraulic motor 38 and thereby reverse the direction of its output shaft with the result the turntable 36 rotates in a counterclockwise direction. Hydraulic motors 88 and 130 have, respectively, spool valves 212 and 214 which are identical to spool valve 208 and which are operated selectively by either foreward solenoids 216 and 218 or reverse solenoids 220 and 222 in the same manner as spool valve 208.

Pressure relieve valves 224, 226 and 228 are provided with hydraulic motor 78, 88 and 130, respectively, for protection purposes and operate in a conventional manner. Similarly, hydraulic and piston units 60, 62 are protected by pressure relieve valve 230. Hydraulic motors 78, 88 and 130 use regulators 232, 234, and 236 for regulating the hydraulic fluid returning to the sump in accordance with conventional practice.

The hydraulic circuit for the cotton bale transfer apparatus 10 also includes a pump 228, pump-motor 230 and tank (with filter) 232 which are mounted on the rearward end of turntable 36. For protection purposes, a pressure relief circuit 234 is connected in parallel with the pump 228, and a filte 236 is provided for filtering the fluid returning to the tank 232.

The electrical control diagram schematically illustrated in FIG. 14 for the cotton bale transfer apparatus 10 will now be explained. The solenoids which control the operation of the various hydraulic devides of FIG. 13 are energized when an electrical contact switch is actuated. These electrical contact switches, except for the start switch 70, are sequentially operated by the moving parts of the cotton bale transfer apparatus 10 to cause the cotton bale transfer apparatus to perform a series of sequential operations. The electrical contact switches and solenoids shown in FIG. 14 are connected across a 120-volt AC line 250, 252 when the ON-OFF switch 254 is closed.

As previously mentioned, after the bands B have been removed from the cotton bale C which is compressed between the upper and lower fork members 14, 16 of press unit 12, the cotton bale transfer device 10 is prepared to start the complete automatic cycle. The cycle is started when the operator depresses the start switch 70, which completes the circuit between contact 70a and 70b and between contacts 70c and 70d. With the closing of the circuit between 70a and 70b, the clockwise solenoid 206 is energized and moves the spool valve 208 to the right with the result the hydraulic motor 78 drives the platform 36 in a clockwise direction.

The closing of contacts 70c–70d energizes hold coil 208, connected across contacts 70c and 70d, to hold the switch 70 in the closed position until the turntable 36 has rotated through a 90° angle and turntable 36 momentarily actuates contact switch 85 to open contacts 85a – 85b. Upon the deenergization of holding coil 208, start switch 70 returns to the normally open position causing the contacts 70a – 70b to open and deenergizing solenoid 20b to terminate the rotation of hydraulic motor 78 with the actuation of electrical switch 85, contacts 85c – 85d are closed to provide a current path to the Forward solenoid 216 of the chain drive assembly 84 which operates spool valve 212 to cause the fluid to flow through the hydraulic motor 88 such that the chain drive assembly 84 moves the carriage assembly 20 in the forward direction.

Because switch contact 85 is only momentarily closed by frame member 30, a holding coil 260, which is energized by the closing of contacts 85e – 85f, holds switch 85 closed until the circuit across contacts 132e – 132f is broken by the actuation of switch 132. When the press unit 12 reaches the press and rebanding station 13, the cotton bale C strikes electrical switch 132 hanging from bracket 134, causing the normally closed circuit across 132e – 132f to open and deenergize holding coil 260. Deenergization of coil 260 causes the opening of switch contacts 85c – 85d to deenergize Forward solenoid 216 and stops the forward movement of carriage assembly 20.

In addition to deenergizing the Forward solenoid 216, the closing of switch 132 simultaneously performs two other operations. Switch contacts 132a–132b close to complete the circuit to the Forward solenoid 218 to energize hydraulic motor 130 and cause the extractor assembly 22 to eject the cotton bale C away from the press unit 12. Simultaneously switch contacts 132g–132h are closed to energize the Open solenoid 202 and thereby cause the piston and hydraulic unit 60–62 to spread apart the fork members 14–16.

The ejection of cotton bale C permits switch 132 to return to its normally open position wherein switch contacts 132c – 132d are closed to energize the Reverse solenoid 222 causing the hydraulic motor 130 to reverse its direction and retract the extractor assembly 22. Upon return of the extractor assembly to its retracted position, switch contact 170 is depressed, opening contacts 170c – 170d and closing contacts 170a – 170b. The opening of contacts 170c – 170d deenergizes the reversing solenoid 222.

The closing of the switch contacts 170a – 170b completes the circuit to the Reversing solenoid 217 of chain drive assembly 84 which energizes the hydraulic motor 88 in the reverse direction and moves the carriage assembly 22 in a rearward direction. The movement of the chain drive assembly 20 stops when the actuating arm 122 carried by chain 102 contacts the switch 124 to open contacts 124a – 124b. Upon the closing of switch 124, a circuit is completed across switch contacts 124c – 124d to provide a current path to Counterclockwise solenoid 210, resulting in the energization of hydraulic motor 78 which drives the turntable 36 in the counterclockwise direction. A holding coil 262 is provided to hold the switch 124 in the closed position until the frame member 30 of the press unit 12 strikes the electrical contact switch 174 on post 71 at unbanding station 18, to open the circuit 174e – 174f and deenergize holding coil 262.

The closing of switch 174 completes a circuit through the normally open contacts 174c – 174d to energize the close solenoid 204 which operates spool valve 200 to direct fluid into the piston and hydraulic units 60, 62 in such a direction that the fork members 14–16 are drawn towards each other and compress a bale of cotton C disposed therebetween. When the piston 66 and 68 of the hydraulic unit 60, 62 have moved a predetermined distance to apply a desired compression force on the ends of the cotton bale C, the electrical switch 176 mounted on the hydraulic control unit 60 is actuated opening the contacts 176a – 176b to thereby deenergize the close solenoid 204. Upon the completion of this last-mentioned operation, the cotton bale transfer apparatus 10 has completed a complete cycle.

We claim:

1. A method for transporting a bale of cotton from an unbanding station to a press and rebanding station using a press unit having a pair of spaced apart fork members and rotatably mounted on a carriage means, comprising the steps of: inserting a cotton bale between said fork members at said unbanding station, closing said fork members together until a predetermined compression force is applied to the opposite ends of said cotton bale, removing the bands from said cotton bale, turning said press unit from a bale loading orientation to a bale unloading orientation, driving said carriage means forward to said press and rebanding station, opening said fork members, ejecting said cotton bale from between said fork members, driving said carriage means in reverse to said unbanding station, and turning said press unit from said bale unloading orientation to said bale loading orientation.

2. The method of claim 1, wherein said bale loading and bale unloading orientations are separated by a ninety degree angle.

* * * * *